(12) United States Patent
Sanzgiri et al.

(10) Patent No.: US 11,165,694 B2
(45) Date of Patent: Nov. 2, 2021

(54) METHODS, SYSTEMS, ARTICLES OF MANUFACTURE AND APPARATUS TO IDENTIFY APPLICATIONS

(71) Applicant: McAfee, LLC, San Jose, CA (US)

(72) Inventors: Ameya Mahesh Sanzgiri, Santa Clara, CA (US); Yi Zheng, Los Gatos, CA (US)

(73) Assignee: MCAFEE, LLC, San Jose, CA (US)

( * ) Notice: Subject to any disclaimer, the term of this patent is extended or adjusted under 35 U.S.C. 154(b) by 0 days.

(21) Appl. No.: 16/050,575

(22) Filed: Jul. 31, 2018

(65) Prior Publication Data
US 2020/0044962 A1    Feb. 6, 2020

(51) Int. Cl.
| | |
|---|---|
| *H04L 12/725* | (2013.01) |
| *H04L 12/781* | (2013.01) |
| *H04L 12/721* | (2013.01) |
| *H04L 12/741* | (2013.01) |
| *H04L 29/06* | (2006.01) |
| *H04L 29/08* | (2006.01) |
| *H04L 12/723* | (2013.01) |

(52) U.S. Cl.
CPC ............ *H04L 45/50* (2013.01); *H04L 45/306* (2013.01); *H04L 45/52* (2013.01); *H04L 45/70* (2013.01); *H04L 45/745* (2013.01); *H04L 63/1425* (2013.01); *H04L 69/22* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 7,644,150 | B1* | 1/2010 | Nucci | H04L 41/0893 |
| | | | | 706/12 |
| 9,191,304 | B1* | 11/2015 | Plate | H04L 12/6418 |
| 9,483,742 | B1* | 11/2016 | Ahmed | H04L 63/1441 |
| 9,495,619 | B2* | 11/2016 | Tang | G06K 9/00476 |
| 9,734,426 | B2* | 8/2017 | Divakaran | G06K 9/6202 |
| 9,762,611 | B2* | 9/2017 | Wallace | H04L 63/123 |

(Continued)

FOREIGN PATENT DOCUMENTS

WO    2020028095 A1    2/2020

OTHER PUBLICATIONS

Shen et al., "Certificate-Aware Encrypted Traffic Classification Using Second-Order Markov Chain," IEEE ACM 24th International Symposium on Quality of Service (IWQoS), Jun. 20-21, 2016, 10 pages.

(Continued)

*Primary Examiner* — Gregory B Sefcheck
(74) *Attorney, Agent, or Firm* — Hanley, Flight & Zimmerman, LLC

(57) ABSTRACT

Methods, systems, articles of manufacture and apparatus to identify an application (app) are disclosed. An example apparatus includes a data labeler to associate first router data with application identification data, a metrics manager to generate metric values associated with a segment of the first router data and generate histograms of the metric values, a classification engine to generate a signature model based on the histograms, and an application identifier to identify the application based on second router data by applying the second router data to the signature model.

30 Claims, 7 Drawing Sheets

(56) References Cited

U.S. PATENT DOCUMENTS

| | | | | |
|---|---|---|---|---|
| 9,954,901 | B2* | 4/2018 | Barabash | H04L 63/0236 |
| 10,009,644 | B2* | 6/2018 | Aimone | A61B 5/0476 |
| 10,089,297 | B2* | 10/2018 | Smith | G06F 17/273 |
| 10,140,553 | B1* | 11/2018 | Vasisht | G06N 3/0454 |
| 10,162,842 | B2* | 12/2018 | Ross | G06F 17/30324 |
| 10,320,813 | B1* | 6/2019 | Ahmed | H04L 63/1441 |
| 10,346,979 | B2* | 7/2019 | Mansi | G16H 50/20 |
| 10,348,650 | B2* | 7/2019 | Zaifman | H04L 43/0876 |
| 10,373,315 | B2* | 8/2019 | Mansi | G16H 40/20 |
| 10,395,181 | B2* | 8/2019 | Bowers | G06F 9/4881 |
| 10,469,327 | B1* | 11/2019 | Velmurugan | H04L 41/0853 |
| 10,476,892 | B2* | 11/2019 | Reddy | H04L 63/0227 |
| 10,484,405 | B2* | 11/2019 | Dasgupta | H04L 63/1458 |
| 10,505,828 | B2* | 12/2019 | Yadav | G06F 16/288 |
| 10,522,108 | B2* | 12/2019 | Deepala | G09G 3/3406 |
| 10,635,983 | B2* | 4/2020 | Battaglino | G06K 9/00523 |
| 10,659,477 | B2* | 5/2020 | Choi | H04L 63/1425 |
| 10,789,504 | B2* | 9/2020 | Yu | G06T 7/13 |
| 10,802,942 | B2* | 10/2020 | Agerstam | G06N 20/00 |
| 2014/0157405 | A1* | 6/2014 | Joll | H04L 63/1425 726/22 |
| 2016/0132771 | A1* | 5/2016 | Shetty | G06Q 30/0631 706/46 |
| 2016/0335553 | A1* | 11/2016 | Battaglino | G10L 21/06 |
| 2017/0223058 | A1* | 8/2017 | Barabash | H04L 63/0236 |
| 2018/0139214 | A1* | 5/2018 | Anderson | H04L 63/145 |
| 2018/0205750 | A1 | 7/2018 | Kohout et al. | |
| 2018/0218275 | A1* | 8/2018 | Arrigoni | G06N 7/005 |
| 2018/0278496 | A1* | 9/2018 | Kulshreshtha | H04L 43/0852 |
| 2018/0278498 | A1* | 9/2018 | Zeng | H04L 43/026 |
| 2018/0287907 | A1* | 10/2018 | Kulshreshtha | H04L 43/026 |
| 2019/0080000 | A1* | 3/2019 | Munoz | G06F 16/00 |
| 2019/0230010 | A1* | 7/2019 | Guo | H04L 65/4084 |
| 2019/0349426 | A1* | 11/2019 | Smith | H04L 67/104 |
| 2019/0364063 | A1* | 11/2019 | Lee | H04L 63/1416 |
| 2020/0014713 | A1* | 1/2020 | Paul | H04L 41/20 |

OTHER PUBLICATIONS

Korczyński et al., "Markov Chain Fingerprinting to Classify Encrypted Traffic," IEEE Conference on Computer Communications, 2014, 9 pages.

Shbair et al., "Improving SNI-Based HTTPS Security Monitoring," Second IEEE International Workshop on Security Testing and Monitoring, Jun. 2016, 7 pages.

International Searching Authority, "International Search Report and Written Opinion," mailed in connection with International Patent Application No. PCT/US2019/042997, dated Sep. 27, 2019, 17 pages.

Lotfollahi et al., "Deep Packet: A Novel Approach for Encrypted Traffic Classification Using Deep Learning," Soft Computing, Sep. 2017, 25 pages.

Taylor et al., "AppScanner: Automatic Fingerprinting of Smartphone Apps from Encrypted Network Traffic," IEEE European Symposium on Security and Privacy, 2016, 16 pages.

Al-Naami et al., "Adaptive Encrypted Traffic Fingerprinting with Bi-Directional Dependence," ACSAC Proceedings of the 32nd Annual Conference on Computer Security Applications, 2016, 13 pages.

International Searching Authority, "International Preliminary Report on Patentability," issued in connection with Application No. PCT/US2019/042997, dated Feb. 2, 2021, 9 pages.

* cited by examiner

| No. | Time | Source | Destination | Protocol | Length | Info |
|---|---|---|---|---|---|---|
| 1 | 0.000000 | 192.168.2.132 | 31.13.77.6 | TCP | 78 | 58302 → 443 [SYN] Seq=0 Win=65535 Len=0 MSS=1460 WS=32 TSval=676575774 TSecr=0 SACK_PERM=1 |
| 2 | 0.006349 | 31.13.77.6 | 192.168.2.132 | TCP | 74 | 443 → 58302 [SYN, ACK] Seq=0 Ack=1 Win=27960 Len=0 MSS=1410 SACK_PERM=1 TSval=1996832677 TSecr=676575774 WS=256 |
| 3 | 0.009091 | 192.168.2.132 | 31.13.77.6 | TCP | 66 | 58302 → 443 [ACK] Seq=1 Ack=1 Win=131392 Len=0 TSval=676575791 TSecr=1996832677 |
| 4 | 0.025763 | 192.168.2.132 | 31.13.76.69 | TCP | 78 | 58303 → 443 [SYN] Seq=0 Win=65535 Len=0 MSS=1460 WS=32 TSval=676575807 TSecr=0 SACK_PERM=1 |
| 5 | 0.047891 | 31.13.76.69 | 192.168.2.132 | TCP | 74 | 443 → 58303 [SYN, ACK] Seq=0 Ack=1 Win=27950 Len=0 MSS=1410 SACK_PERM=1 TSval=527691708 TSecr=676575807 WS=256 |
| 6 | 0.051533 | 192.168.2.132 | 31.13.76.69 | TCP | 66 | 58303 → 443 [ACK] Seq=1 Ack=1 Win=131392 Len=0 TSval=676575832 TSecr=527691708 |
| 7 | 0.057831 | 192.168.2.132 | 31.13.77.6 | FB_ZERO | 285 | Client Hello |
| 8 | 0.062158 | 31.13.77.6 | 192.168.2.132 | TCP | 66 | 443 → 58302 [ACK] Seq=1 Ack=220 Win=29184 Len=0 TSval=1996832733 TSecr=676575837 |
| 9 | 0.062466 | 31.13.77.6 | 192.168.2.132 | FB_ZERO | 204 | Server NOM??? |
|  | 0.062739 | 31.13.77.6 | 192.168.2.132 | FB_ZERO | 143 | Payload (Encrypted) |
|  | 0.068843 | 192.168.2.132 | 31.13.77.6 | TCP | 66 | 58302 → 443 [ACK] Seq=220 Ack=139 Win=131264 Len=0 TSval=676575848 TSecr=1996832733 |
|  | 0.070348 | 192.168.2.132 | 31.13.77.6 | TCP | 66 | 58302 → 443 [ACK] Seq=220 Ack=216 Win=131168 Len=0 TSval=676575850 TSecr=1996832733 |
|  | 0.078845 | 192.168.2.132 | 31.13.76.69 | FB_ZERO | 287 | Client Hello |
|  | 0.096620 | 31.13.76.69 | 192.168.2.132 | TCP | 66 | 443 → 58303 [ACK] Seq=1 Ack=222 Win=29184 Len=0 TSval=527691756 TSecr=676575857 |
|  | 0.096934 | 31.13.76.69 | 192.168.2.132 | FB_ZERO | 204 | Server NOM??? |
|  | 0.097209 | 31.13.76.69 | 192.168.2.132 | FB_ZERO | 143 | Payload (Encrypted) |
|  | 0.106777 | 192.168.2.132 | 31.13.76.69 | TCP | 66 | 58303 → 443 [ACK] Seq=222 Ack=139 Win=131264 Len=0 TSval=676575885 TSecr=527691756 |
|  | 0.107320 | 192.168.2.132 | 31.13.76.69 | TCP | 66 | 58303 → 443 [ACK] Seq=222 Ack=216 Win=131168 Len=0 TSval=676575885 TSecr=527691756 |
|  | 0.157771 | 192.168.2.132 | 31.13.76.69 | FB_ZERO | 931 | Payload (Encrypted) |
|  | 0.160131 | 192.168.2.132 | 31.13.76.69 | FB_ZERO | 100 | Payload (Encrypted) |
|  | 0.180444 | 31.13.76.69 | 192.168.2.132 | FB_ZERO | 113 | Payload (Encrypted) |
|  | 0.185321 | 192.168.2.132 | 31.13.76.69 | TCP | 66 | 58303 → 443 [ACK] Seq=1121 Ack=263 Win=131136 Len=0 TSval=676575962 TSecr=527691837 |
|  | 0.199736 | 31.13.76.69 | 192.168.2.132 | FB_ZERO | 415 | Payload (Encrypted) |
|  | 0.204195 | 192.168.2.132 | 31.13.76.69 | TCP | 66 | 58303 → 443 [ACK] Seq=1121 Ack=612 Win=130784 Len=0 TSval=676575980 TSecr=527691859 |

FIG. 3

METHODS, SYSTEMS, ARTICLES OF MANUFACTURE AND APPARATUS TO IDENTIFY APPLICATIONS

FIELD OF THE DISCLOSURE

This disclosure relates generally to network security, and, more particularly, to methods, systems, articles of manufacture and apparatus to identify applications.

BACKGROUND

In recent years, users of computing devices have been provided access to an increasing number of applications (sometimes referred to as "apps"). Sources of computing applications (apps) include the Google Play Store® for Android®-based computing devices, the Apple App Store® for Apple®-based computing devices, and the Microsoft Store® for computing devices that use variants of the Windows® operating system. Additional sources of executable content include the Amazon App Store®, and/or various Internet-based sources (e.g., Android Package Kit (APK) files, apps from Cydia sideloaded to iOS devices, etc.). Internet-based sources sometimes include apps not authorized and/or otherwise not vetted by manufacturers of computing device operating systems.

BRIEF DESCRIPTION OF THE DRAWINGS

FIG. 3 is a chart of example router data obtained by the example fingerprinter of FIGS. 1 and/or 2.

The figures are not to scale. In general, the same reference numbers will be used throughout the drawing(s) and accompanying written description to refer to the same or like parts.

DETAILED DESCRIPTION

Figure 1:
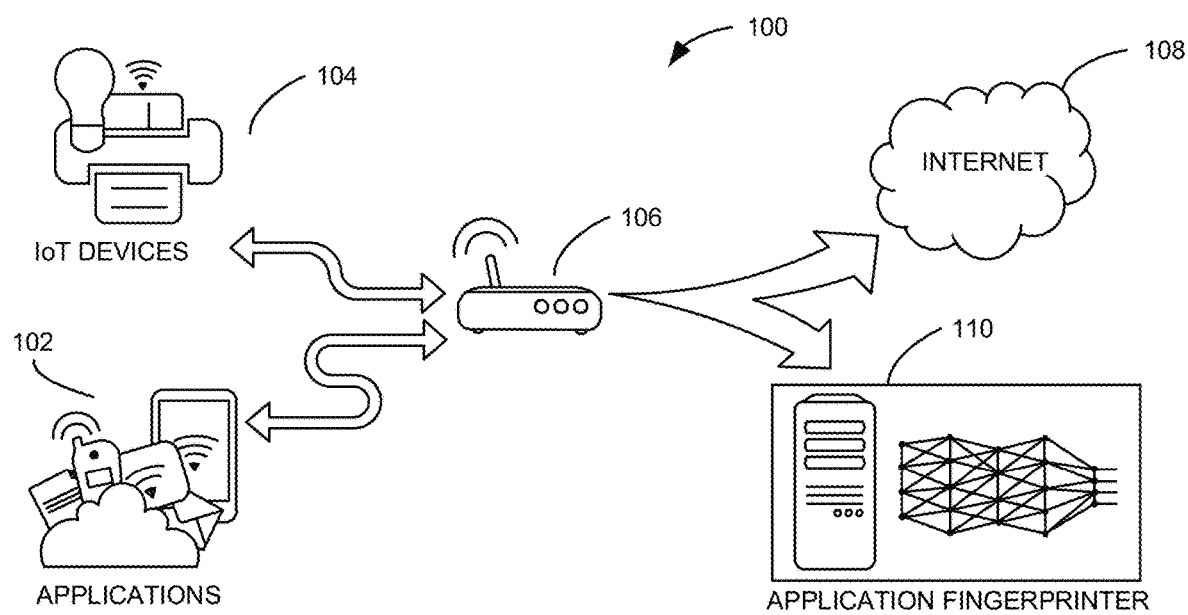
FIG. 1 is a schematic illustration of an example networking environment to identify applications in a manner consistent with teachings of this disclosure.

Network security and device security can be harmed and/or otherwise adversely affected by some applications (apps) and/or devices, particularly apps of a malicious nature (e.g., virus-infested apps, malware-infested apps, etc.). As used herein, "apps" refers to code that can execute on computing devices such as computers, laptops, tablets, wireless telephones, Internet of Things (IoT) devices, etc. In some examples, certain apps consume a significant amount of processing and/or networking resources, thereby decreasing performance of the host device on which the app executes. In some examples, certain apps include malicious code to circumvent data privacy expectations of the host device and/or its user.

To identify particular apps operating on a user device, current/traditional analysis techniques perform packet inspection and/or protocol analysis. Packet inspection, when feasible, facilitates signature analysis and information related to domain name server (DNS) activity. DNS caching may identify an app by analyzing a corresponding domain name contained within packet communications (e.g., information within a payload of a packet). For example, a Facebook® app establishes communication with the facebook.com domain. While packet inspection can, in some examples, identify a corresponding app that is operating on a host device and/or consuming network resources, such packet inspection techniques inherently introduce privacy concerns. Accordingly, some computing environments prohibit packet inspection, particularly when entities performing the packet inspection cannot be properly vetted as trustworthy. Additionally, packet inspection requires relatively substantial computing resources that fails to scale well in view of industry standard computing costs. For instance, traditional approaches using deep packet inspection require decryption prior to content analysis of each received packet. In the event a relatively large number of devices is to be inspected (e.g., 20-30 devices), then packet data from each device must be decrypted and analyzed for signatures that may match flagged apps. Such an approach requires significant computational and/or network analysis capabilities on a level typically associated with enterprise entities with powerful processing devices (e.g., processors and/or other logic circuits capable of analysis rates of several megabytes per second per device).

Packet inspection is particularly cumbersome for encrypted packets. For example, a secure extension of hypertext transfer protocol (HTTP) is referred-to as HTTPS. Packets transported in association with HTTPS are encrypted (e.g., using transport layer security (TLS)). Because HTTPS protocol communication is encrypted in a bidirectional manner between a sender and a receiver, man-in-the-middle attacks are thwarted. Similarly, attempts to perform packet inspection on packets using the HTTPS protocol by a device other than the sender or receiver are not feasible because payload data cannot be analyzed without prior decryption effort. Use of HTTPS also prevents fingerprinting techniques related to protocol identification, protocol analysis (e.g., analysis of source/destination ports), URL/DNS-based mapping (e.g., sometimes referred to as Server Name Identification (SNI)), and/or combinations of the above. In particular, HTTPS prevents any unique mapping of the SNI, and prevents detection of domain name inspection via DNS caching. While one or more of the aforementioned limitations and/or computational burdens may be reduced via endpoint solutions (as used herein, an endpoint reflects access to the user device and privileged system-level and/or operating-system level access, such as privileged access via on-device software/hardware), such endpoint approaches are cumbersome, do not scale well to relatively large numbers of user devices, and/or require privacy authorization by the users of the respective devices.

Methods, systems, articles of manufacture and apparatus are disclosed herein to identify application execution without requiring endpoint access and does not invoke the privacy concerns associated with packet inspection techniques. Additionally, examples disclosed herein identify application execution for packet types in an encrypted or unencrypted state/environment. Stated differently, examples disclosed herein identify application execution in an encryption-agnostic manner. Examples disclosed herein acquire readily available router traffic data, determine and/or otherwise calculate network metrics (e.g., network statistics) associated with the router traffic data, convert the network metrics to histograms, and utilize the histograms to train a model (e.g., via application of convolutional neural network (CNN) techniques). In other words, examples disclosed herein transform acquired networking data into another format that facilitates model training. Once the model is trained, examples disclosed herein facilitate runtime detection of applications (e.g., applications executing) for any number of devices connected to the router.

FIG. 1 is a schematic illustration of an example networking environment 100 in which examples disclosed herein identify application execution. In the illustrated example of FIG. 1, the networking environment 100 includes any number of applications 102 executing on any number of computing devices 104 (e.g., end user devices such as wireless telephones, Internet of Things (IoT) devices, etc.) communicatively connected to a router 106. The example router 106 may be communicatively connected to any number of networks 108, including the Internet, an intra-net, a wide-area-network (WAN), etc. The example networking environment 100 also includes an application fingerprinter 110 communicatively connected to the example router 106.

In the illustrated example of FIG. 1, the application fingerprinter 110 is communicatively connected to the example network 108 and the example router 106, as described above. In some examples, the application fingerprinter 110 may be a part of the router 106 (e.g., a hardware implemented application fingerprinter 110, a software implemented application fingerprinter 110, and/or combinations thereof).

In operation, the example application fingerprinter 110 determines whether it is to operate in a training mode or a runtime mode. For example, if the application fingerprinter 110 does not have one or more models with which to use in connection with router data input (e.g., real-time router data inputs), examples disclosed herein operate in a training mode to generate one or more models in an effort to identify particular signatures associated with apps. Generally speaking, apps that execute exhibit unique communication demands. Such unique communication demands have corresponding metrics, such as bandwidth metrics, communication frequency metrics, particular statistics metrics (e.g., an average bandwidth per unit of time), particular Internet protocol (IP) address usage metrics, etc. As described above and in further detail below, examples disclosed herein train one or more models (e.g., execution signature models) based on retrieved network activity data from the router 106. As used herein, a model or a signature model reflects a probabilistic analysis of candidate output conditions as distinguished from a deterministic model that typically requires exact parity in matching conditions before an event is determined to occur. Once the one or more models has been trained, such model(s) are utilized by the fingerprinter 110 during a runtime mode to identify application(s), such as applications executing on a computing/networked device. When the example application fingerprinter 110 is in the training mode, the example application manager 202 invokes a known application (e.g., via one or more commands over the example network 108 to one or more devices 104 and/or applications 102). However, in some examples the application manager 202 does not invoke and/or generate commands to initiate application execution, but rather prompts an analyst to cause execution of known applications on user devices that are communicatively connected to the example router 106.

Figure 2:
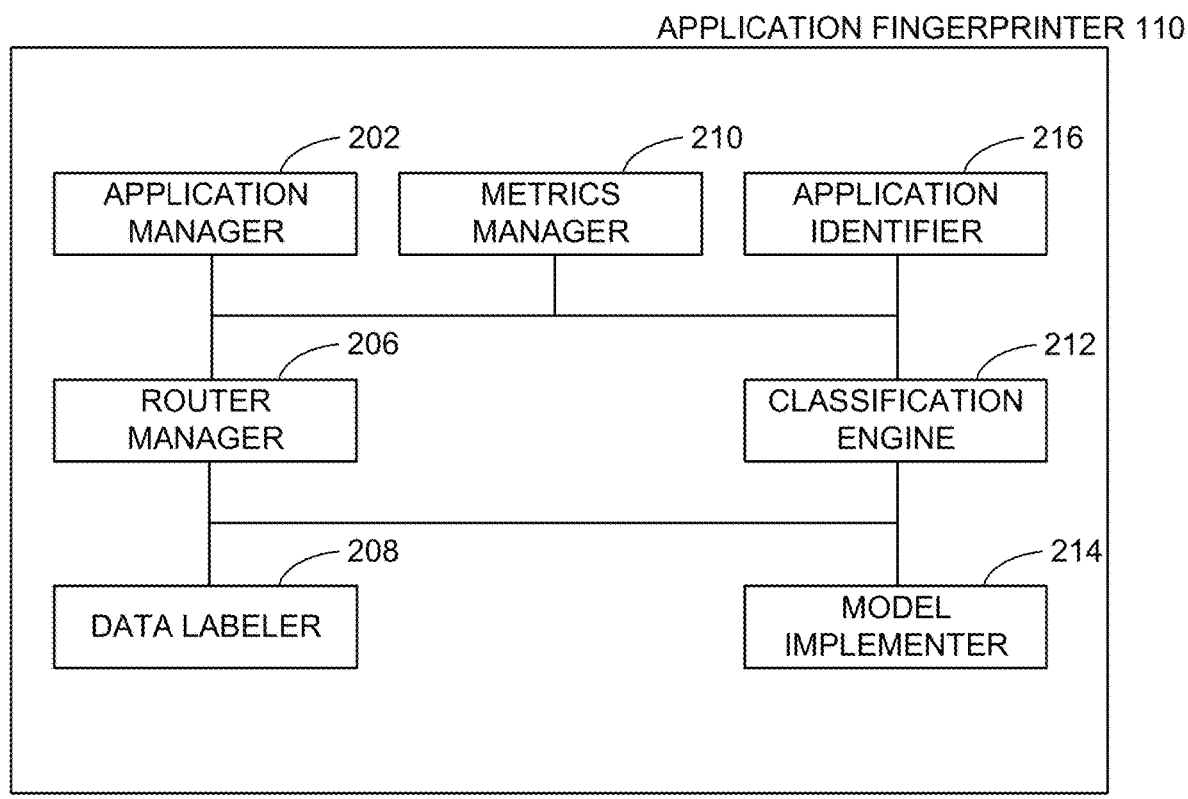
FIG. 2 is a schematic illustration of an example implementation of the fingerprinter of FIG. 1.

FIG. 2 is a schematic illustration of an example implementation of the application fingerprinter 110 of FIG. 1. The example application fingerprinter 110 of FIG. 2 includes an example application manager 202, an example router manager 206, an example data labeler 208, an example metrics manager 210, an example classification engine 212, an example model implementer 214, and an example application identifier. The example router manager 206 identifies, collects, receives and/or otherwise retrieves data from the example router 106.

FIG. 3 illustrates example router data 300 (e.g., in tabular format) that has been retrieved and/or otherwise identified by the example router manager 206. In the illustrated example of FIG. 3, the router data 300 includes time and date information 302 (e.g., timestamp information), source Internet Protocol (IP) address information 304, destination IP address information 306, protocol information 308, packet length information 310 (e.g., and/or other packet-size related information), and other packet information 312. In some examples, the other packet information 312 includes payload information that may be encrypted. While the example packet information 312 may be encrypted (e.g., when HTTPS is used), thereby preventing any word searching efforts to identify potentially malicious apps, information associated with the source IP address 304 and the destination IP address 306 are readily available from the router 106.

The example data labeler 208 of FIG. 2 labels the router data 300 based on applications known to be executing. The example data labeler 208 divides the acquired and labeled data into segments, such as segments of connection pairings (e.g., communication pairings) between a source IP address and a destination IP address. As shown in the illustrated example of FIG. 3, a first source IP address 314 has a value 192.168.2.132 that is indicative of a device on a local network associated with the router 106, and a first destination IP address 316 has a value 31.13.77.6 that is indicative of a device on a network external to the router 106. Taken together, the example first source IP address 314 and the example first destination IP address 316 from an example first pairing 318 that may occur and/or otherwise appear in the example router data 300. As used herein, a pairing (communication pairing) is also referred to as a segment indicative of communication between a first and second IP address. Additionally, because the example first source IP address is associated with communication activity local to the example router 106, such communication is indicative of a device local to the router 106 initiating a communication attempt. Conversely, FIG. 3 illustrates an example second source IP address 320 and an example second destination IP address 322 that includes the same IP addresses as described above, but switched in terms of the entity that is deemed to have initiated the communication attempt. In some examples, the data labeler 208 identifies whether a particular IP address is local and, if so, associates such communications with a user device local to the router.

When the same IP address pair (i.e., IP address 31.13.77.6 and IP address 192.168.2.132) occurs a subsequent (e.g., a second) time, there is a second pairing 324. The example data labeler 208 divides such pairings as segments that, taken together over a threshold amount of time or occurrences, represents a portion (segment) of network data that forms the basis of metrics (e.g., statistics) to be calculated. To illustrate, seven (7) additional pairings between the IP address 31.13.77.6 and the IP address 192.168.2.132 occur in the example router data 300 of FIG. 3 that can form the segment of interest that further forms the basis for metrics (e.g., statistics) generation.

The example metrics manager 210 of FIG. 2 selects a traffic metric (e.g., statistic) of interest, such as a frequency of communication (e.g., a number of communication attempts between source/destination IP address pairs per unit of time), a duration of communication (e.g., an average number of packets occurring per communication attempt between the source/destination IP address pair), a packet size of communication (e.g., an average, minimum and/or maximum packet size metric between source/destination IP address pairs), etc. After the example metrics manager 210 selects one or more traffic metrics (e.g., statistics) of interest, it generates corresponding metric values associated therewith and then generates corresponding histograms of the metrics (e.g., statistics) of interest.

Figure 4:
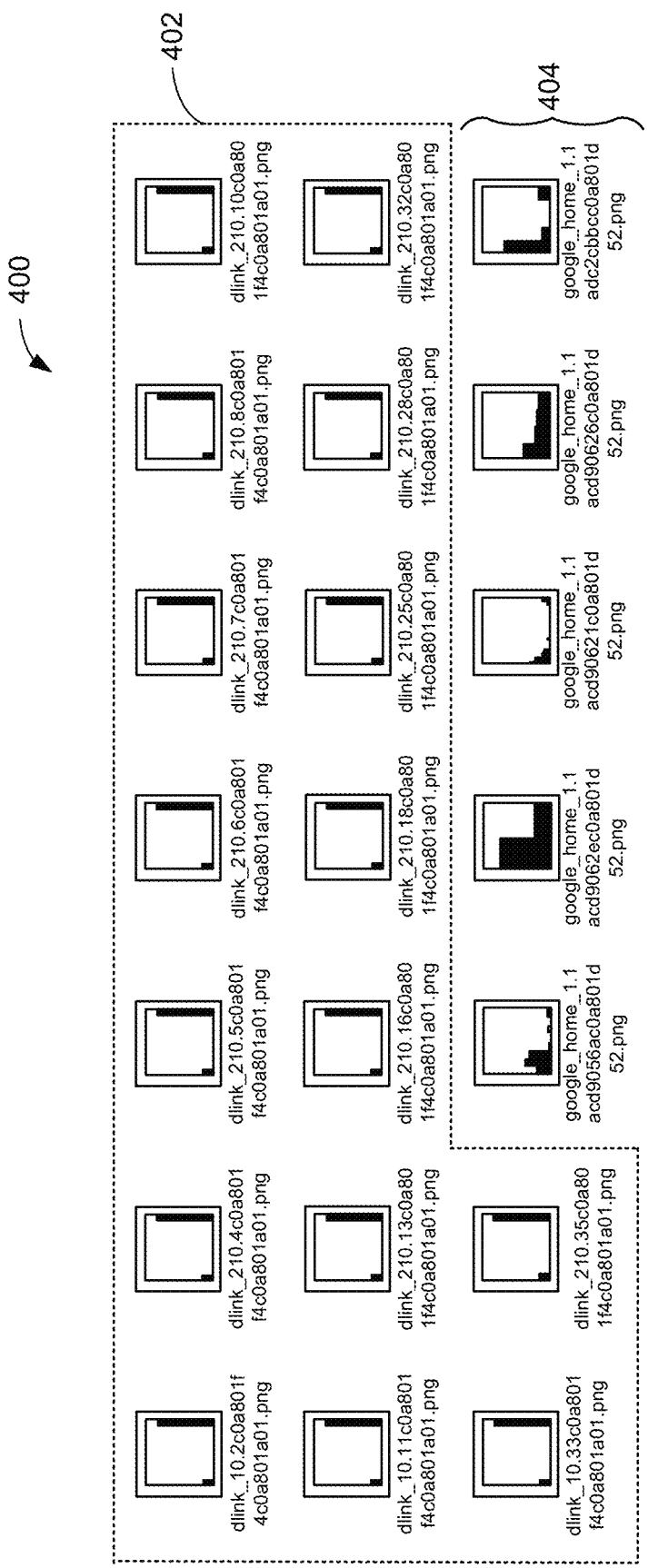
FIG. 4 illustrates example histograms generated by the example fingerprinter of FIGS. 1 and/or 2.

FIG. 4 illustrates example histograms 400 generated by the example metrics manager 210 of FIG. 2. In the illustrated example of FIG. 4, first histograms 402 are encircled (see dashed-in area) to represent histograms generated from metrics (e.g., statistics) associated with an IP camera app (e.g., DLink®) and second histograms 404 are shown in the lower-right hand side of FIG. 4 to represent histograms generated from metrics associated with a smart speaker app (e.g., Google Home®). Generally speaking, different apps are expected to exhibit particular histogram signatures. While the illustrated example of FIG. 4 includes two example apps, examples disclosed herein are not limited thereto. In some examples, the metrics manager 210 selects segments of interest for a particular threshold of time (e.g., a "chunk"), such as a threshold number of milliseconds, a threshold number of seconds, a threshold number of minutes, a threshold number of hours, etc.

After any number of histograms have been generated by the example metrics manager 210, the example classification engine 212 builds a model by applying the labeled histograms (e.g., the histograms 400 of FIG. 4) to a classifier, such as the example classification engine 212 of FIG. 2. In some examples, the classification engine 212 includes the classifier, while in other examples the classifier is accessed by the example application fingerprinter 110 via the example network 108.

Figure 5:
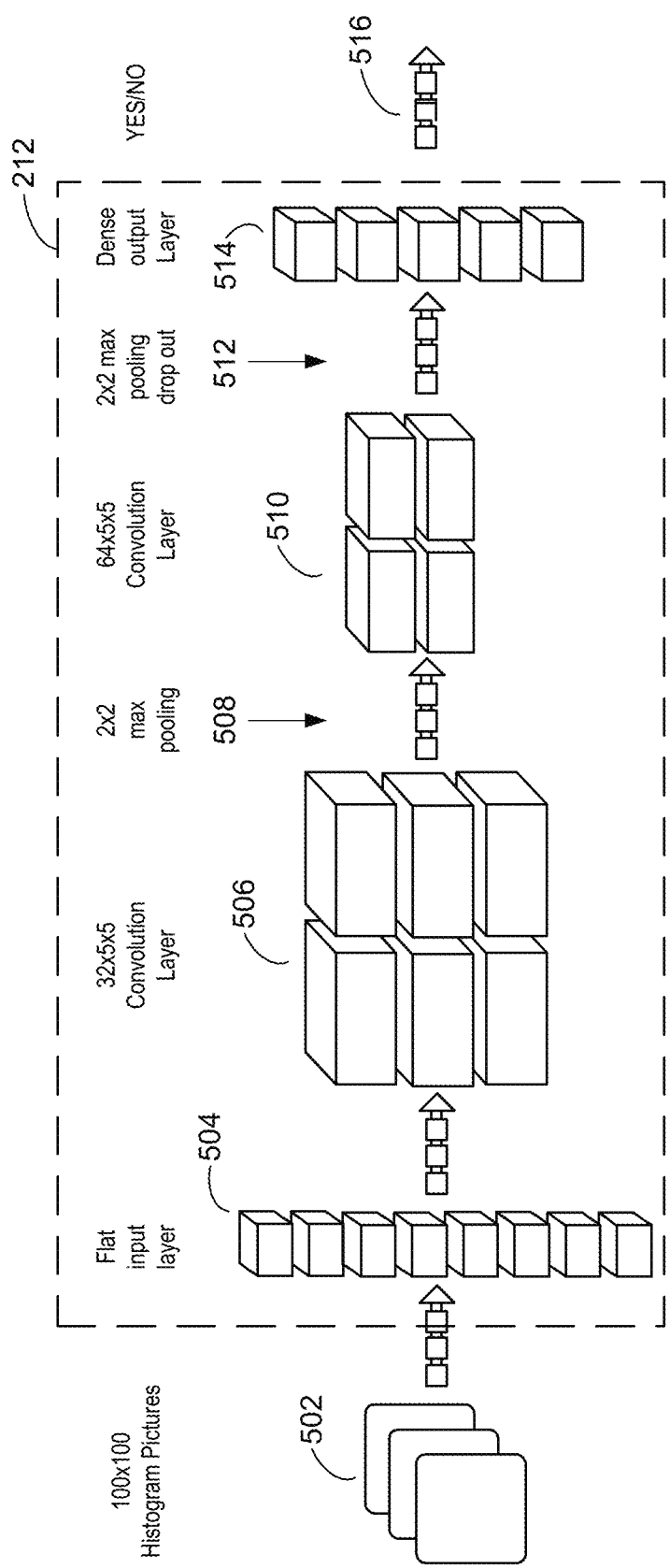
FIG. 5 illustrates an example implementation of a classifier of the example fingerprinter of FIGS. 1 and/or 2.

FIG. 5 illustrates an example implementation of the example classification engine 212 of FIG. 2. The example classifier 212 may or may not be part of the example classification engine 212. In the illustrated example of FIG. 5, the classifier 212 is provided histograms 502 as an input, such as the example histograms 400 of FIG. 4. The example classifier 212 of FIG. 5 is constructed as a neural network, such as a deep neural network or a convolutional neural network (CNN), but examples disclosed herein are not limited thereto. For instance, the example classifier 212 may be implemented with/as random forest techniques, Markov chains and/or feature engineering techniques. The example classifier 212 of FIG. 5 is an example CNN classifier that includes an example flat input layer 504 (e.g., a first layer), an example first convolution layer 506 (e.g., a second layer), an example pooling layer 508 (e.g., a third layer), an example second convolution layer 510 (e.g., a fourth layer), an example pooling dropout layer 512 (e.g., a fifth layer), and an example dense output layer 514 (e.g., a sixth layer). While the example classifier 212 of FIG. 5 is shown with six example layers, examples disclosed herein are not limited thereto and any number of layers may be used.

Figure 7:
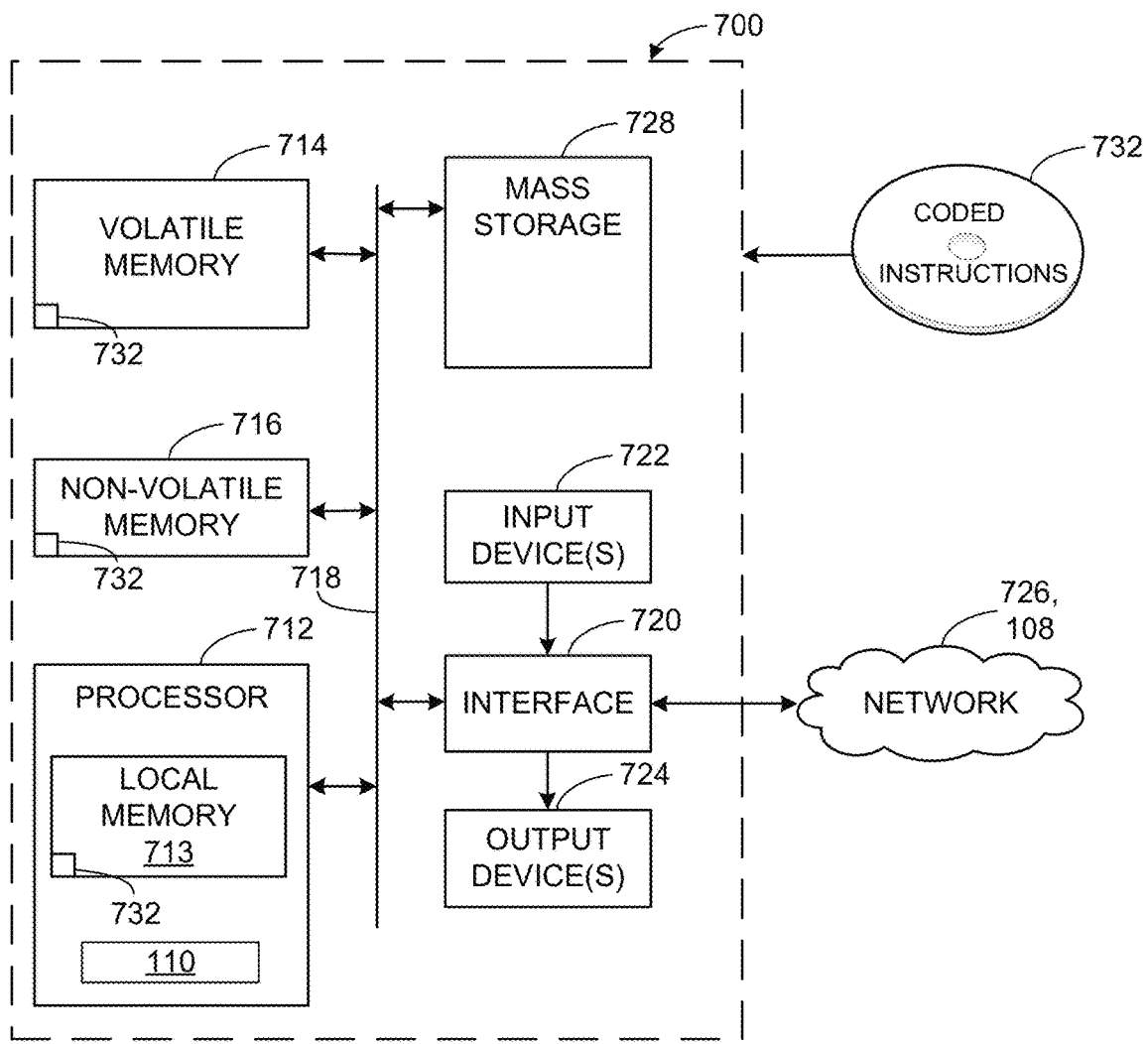
FIG. 7 is a block diagram of an example processing platform structured to execute the instructions of FIG. 6 to implement the example fingerprinter of FIGS. 1 and/or 2.

In operation, the example classifier 212 is trained with the input data 502 (the histograms—labeled data), in which model parameters and/or bias values are determined. Typical neural network models also define a loss function as softmax cross entropy, but evaluation of the input data may also be performed via random forest techniques, Markov chains and/or feature engineering techniques, as described above. During runtime, the input data 502 may include network metrics (e.g., statistics), but such input data 502 is not labeled and the classifier provides an output 516 indicative of the particular application that is executing. Stated differently, during runtime the example model implementer 214 applies router data to the trained model (e.g., the example classifier 212) and the example application identifier 216 retrieves probability scores as the output 516 of the classifier 212 to identify the particular application. In some examples, the output 516 (e.g., the output of the execution signature model) includes any number of candidate application names and associated probability scores, in which a highest relative score is identified as the executing application. Still further, the example application manager 202 invokes one or more application control actions in response to the type of app that is executing. In some examples, the application manager 202 permits (e.g., not block) app execution in the event the app is deemed safe (e.g., when the app includes an indication of trust, such as indications of trust from a malware database), while in other examples the application manager 202 blocks the app execution in the event the app is deemed malicious or otherwise untrustworthy (e.g., when the app includes an indication of harm). In some examples, the application manager 202 blocks the app execution by prohibiting any router network communication associated with a particular IP address that is associated with a potentially malicious app and/or when detected app behaviors exhibit a deviation from policy expectations and/or policy boundary metrics (a policy deviation). For example, the metrics manager 210 may compare detected router metrics against previously established policy metrics (e.g., previously established policy metrics stored in a database or memory device of the example application fingerprinter 110 and/or stored in a mass storage device 728 as shown in FIG. 7). In some examples, policy metrics may set one or more thresholds for a behavior, such as a threshold number of outbound IP address communication requests per unit of time, a threshold packet size, etc.

While an example manner of implementing the application fingerprinter 110 and/or, more generally, the example networking environment 100 of FIGS. 1 and 2 are illustrated in FIGS. 1-5, one or more of the elements, processes and/or devices illustrated in FIGS. 1-5 may be combined, divided, re-arranged, omitted, eliminated and/or implemented in any other way. Further, the example application manager 202, the example router manager 206, the example data labeler 208, the example metrics manager 210, the example classification engine 212 (e.g., including the example classifier therein), the example model implementer 214, the example application identifier 216 and/or, more generally, the example application fingerprinter 110 of FIG. 2 may be implemented by hardware, software, firmware and/or any combination of hardware, software and/or firmware. Thus, for example, any of the example application manager 202, the example router manager 206, the example data labeler 208, the example metrics manager 210, the example classification engine 212 (e.g., and the example classifier therein), the example model implementer 214, the example application identifier 216 and/or, more generally, the example application fingerprinter 110 of FIGS. 1 and 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example application manager 202, the example router manager 206, the example data labeler 208, the example metrics manager 210, the example classification engine 212 (e.g., and/or the example classifier therein), the example model implementer 214, the example application identifier 216 and/or, more generally, the example application fingerprinter 110 of FIGS. 1 and 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example application fingerprinter 110 of FIGS. 1 and 2 may include one or more elements, processes and/or devices in addition to, or instead of, those illustrated in FIG. 4, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
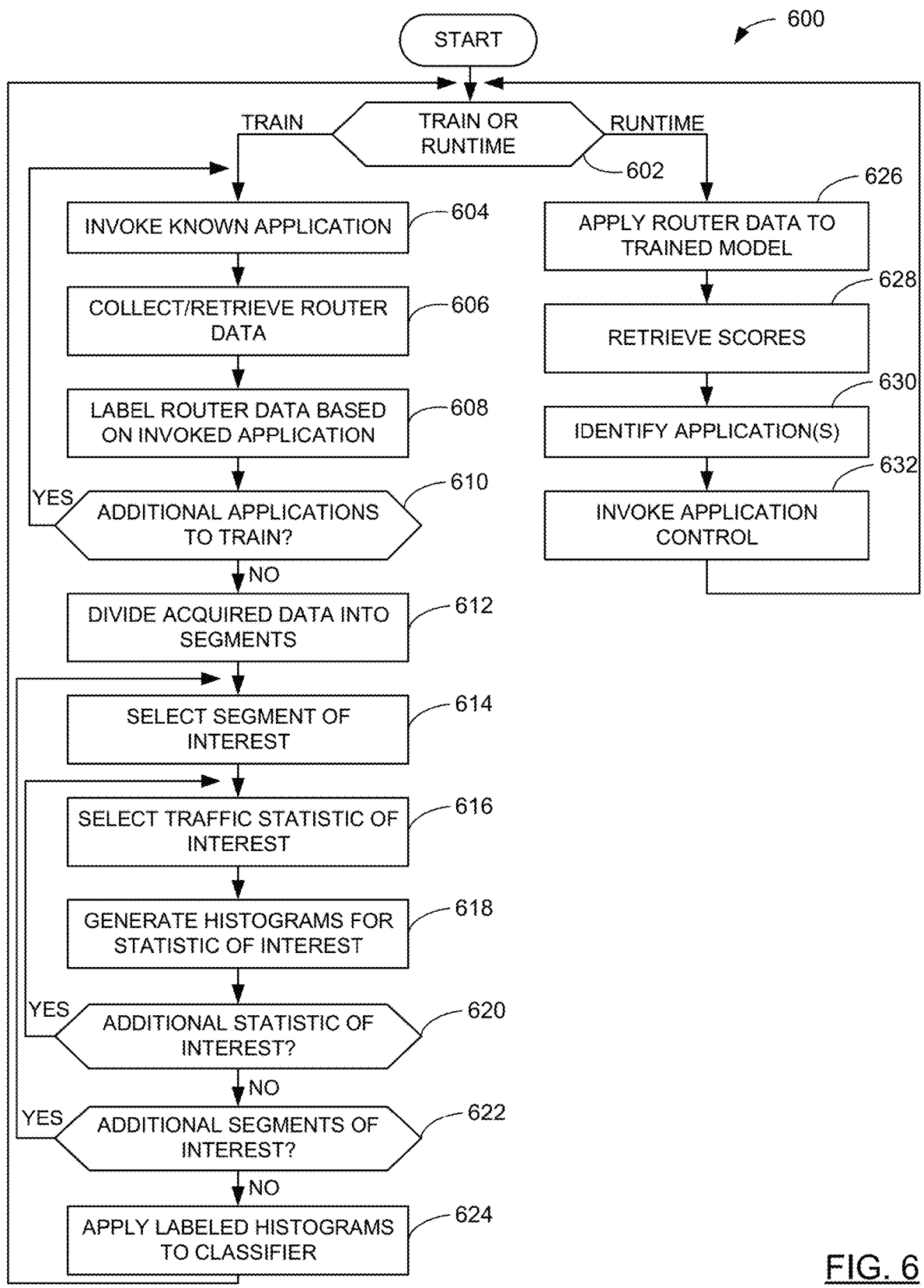
FIG. 6 is a flowchart representative of example machine readable instructions which may be executed to implement the example fingerprinter of FIGS. 1 and/or 2 to identify application execution.

Flowcharts representative of example hardware logic, machine readable instructions, hardware implemented state machines, and/or any combination thereof for implementing the application fingerprinter 110 of FIGS. 1 and 2 are shown in FIG. 6. The machine readable instructions may be an executable program(s) or portion of an executable program for execution by a computer processor such as the processor 712 shown in the example processor platform 700 discussed below in connection with FIG. 7. The program(s) may be embodied in software stored on a non-transitory computer readable storage medium such as a CD-ROM, a floppy disk, a hard drive, a DVD, a Blu-ray disk, or a memory associated with the processor 712, but the entire program(s) and/or parts thereof could alternatively be executed by a device other than the processor 712 and/or embodied in firmware or dedicated hardware. Further, although the example program(s) is/are described with reference to the flowchart illustrated in FIG. 6, many other methods of implementing the example application fingerprinter 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

The program 600 of FIG. 6 includes block 602, where the example application fingerprinter 110 determines whether to operate in a training mode or a runtime mode. In the event the example application fingerprinter 110 determines it is to operate in a training mode (block 602), then the example application manager 202 invokes a known application (block 604). The example router manager 206 identifies, collects, obtains and/or otherwise receives router data (block 606), such as the example router data 300 of FIG. 3. In some examples, the router manager 206 identifies, collects, obtains and/or otherwise receives one or more types of the router data (e.g., the router data of FIG. 3), while in other examples the router manager 206 identifies all of the timestamp information, source IP address information, destination IP address information and packet information. The example data labeler 208 labels the router data based on invoked and/or otherwise known executing apps (block 608), and the application manager 202 determines whether there are one or more additional apps to be considered during the training process (block 610). If so, then control returns to block 604, otherwise the example data labeler 208 divides the acquired data into segments of interest (block 612).

As described above, segments of interest may include connection pairings between a source IP address and a destination IP address. The example data labeler 208 selects a segment of interest (block 614), and the example metrics manager 210 selects a traffic metric (e.g., statistic) of interest and generates corresponding metrics (e.g., statistics) values (block 616). The example metrics manager 210 generates histograms for the metric (e.g., statistic) of interest (block 618), and determines whether there are one or more additional metrics of interest to be considered (block 620). If so, control returns to block 616, otherwise the example data labeler 208 determines whether there are one or more additional segments of interest to consider (block 622). If so, control returns to block 614, otherwise the example classification engine 212 builds a model by applying labeled histograms to a classifier (block 624), such as the example classifier 212 of FIG. 5. Trained models may be stored in a memory and invoked during a runtime mode.

In the event the example application fingerprinter 110 determines that a runtime mode is to operate (block 602), then the example model implementer 214 applies retrieved, received and/or otherwise obtained router data (e.g., network traffic data 300 as shown in the illustrated example of FIG. 3) to the trained model (block 626). The example application identifier 216 retrieves probability scores from the output of the model (block 628) (e.g., from the example output 516 of FIG. 5) and identifies a corresponding app that is executing (block 630). Based on the executing app and one or more user defined rules/instructions, the example application manager 202 invokes app control (block 632), such as permitting the continued router communication associated with apps that are deemed safe and blocking router communication associated with apps that are deemed dangerous (e.g., virus-related apps, malware-related apps, etc.).

FIG. 7 is a block diagram of an example processor platform 700 structured to execute the instructions of FIG. 4 to implement the example application fingerprinter 110 of FIGS. 1 and 2. The processor platform 700 can be, for example, a server, a personal computer, a workstation, a self-learning machine (e.g., a neural network, a deep neural network, a convolutional neural network, etc.), a mobile device (e.g., a cell phone, a smart phone, a tablet such as an iPad™), a personal digital assistant (PDA), an Internet appliance, a gaming console, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example application manager 202, the example router manager 206, the example data labeler 208, the example metrics manager 210, the example classification engine 212 (e.g., and/or the example classifier therein), the example model implementer 214, the example application identifier 216 and/or, the example application fingerprinter 110.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 4 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that identify application execution in a manner that does not require endpoint device access and, instead, determines app execution based on readily available router data, even in circumstances where the payload network data is encrypted. Accordingly, examples disclosed herein identify particular apps in a manner that does not raise privacy issues because no effort is made to examine, decrypt and/or otherwise view private network payload information (even if it is not already encrypted). Disclosed methods, apparatus and articles of manufacture improve the efficiency of a computing device by identifying malware apps without spending any computer processing cycles decrypting captured network communications, thereby allowing identification to occur with relatively less expensive hardware as opposed to enterprise-grade routers and/or computers. Disclosed methods, apparatus and articles of manufacture are accordingly directed to one or more improvement(s) in the functioning of a computer.

Example 1 includes an apparatus to identify an application, the apparatus comprising a data labeler to associate first router data with application identification data, a metrics manager to generate metric values associated with a segment of the first router data, and generate histograms of the metric values, a classification engine to generate a signature model based on the histograms, and an application identifier to identify the application based on second router data by applying the second router data to the signature model.

Example 2 includes the apparatus as defined in example 1, further including a router manager to retrieve the first router data from a router at a first time, the first time associated with a training mode.

Example 3 includes the apparatus as defined in example 2, wherein the router manager is to retrieve the second router data from the router at a second time, the second time after the first time, and associated with a runtime mode.

Example 4 includes the apparatus as defined in example 2, wherein the router manager is to identify at least one of timestamp information, source internet protocol (IP) address information, destination IP address information or packet length information.

Example 5 includes the apparatus as defined in example 2, wherein the router manager is to identify timestamp information, source Internet protocol (IP) address information, destination IP address information and packet length information.

Example 6 includes the apparatus as defined in example 1, wherein the data labeler is to identify the segment as a communication pairing between a first internet protocol (IP) address and a second IP address.

Example 7 includes the apparatus as defined in example 6, wherein the data labeler is to identify at least one of the first IP address or the second IP address of the segment as associated with a user device local to a router.

Example 8 includes the apparatus as defined in example 1, wherein the application identifier is to retrieve scores from the signature model, the scores respectively associated with respective applications.

Example 9 includes the apparatus as defined in example 1, wherein the metrics values generated by the metrics manager include a frequency of communication between a first internet protocol (IP) address and a second IP address.

Example 10 includes the apparatus as defined in example 1, wherein the metrics values generated by the metrics manager include at least one of a communication duration or a communication packet size.

Example 11 includes the apparatus as defined in example 1, further including an application manager to not block communication for an internet protocol (IP) address associated with an application when the application is associated with an indication of trust.

Example 12 includes the apparatus as defined in example 11, wherein the application manager is to block communication for the IP address associated with the application when the application is associated with an indication of harm.

Example 13 includes the apparatus as defined in example 11, wherein the application manager is to block communication for the IP address associated with the application when the application is associated with a policy deviation.

Example 14 includes a computer implanted method to identify an application, the method comprising associating, by executing an instruction with at least one processor, first router data with application identification data, generating, by executing an instruction with the at least one processor, metric values associated with a segment of the first router data, generating, by executing an instruction with the at least one processor, histograms of the metric values, generating, by executing an instruction with the at least one processor, a signature model based on the histograms, and identifying, by executing an instruction with the at least one processor, the application based on second router data by applying the second router data to the signature model.

Example 15 includes the method as defined in example 14, further including retrieving the first router data from a router at a first time, the first time associated with a training mode.

Example 16 includes the method as defined in example 15, further including retrieving the second router data from the router at a second time, the second time after the first time, and associated with a runtime mode.

Example 17 includes the method as defined in example 15, further including identifying at least one of timestamp information, source internet protocol (IP) address information, destination IP address information or packet length information.

Example 18 includes the method as defined in example 15, further including identifying timestamp information, source Internet protocol (IP) address information, destination IP address information and packet length information.

Example 19 includes the method as defined in example 14, further including identifying the segment as a communication pairing between a first internet protocol (IP) address and a second IP address.

Example 20 includes the method as defined in example 19, further including identifying at least one of the first IP address or the second IP address of the segment as associated with a user device local to a router.

Example 21 includes the method as defined in example 14, further including retrieving scores from the signature model, the scores respectively associated with respective applications.

Example 22 includes the method as defined in example 14, further including identifying metrics values as a frequency of communication between a first internet protocol (IP) address and a second IP address.

Example 23 includes the method as defined in example 14, further including identifying metrics values as at least one of a communication duration or a communication packet size.

Example 24 includes the method as defined in example 14, further including not blocking communication for an internet protocol (IP) address associated with an application when the application is associated with an indication of trust.

Example 25 includes the method as defined in example 24, further including blocking communication for the IP address associated with the application when the application is associated with an indication of harm.

Example 26 includes the method as defined in example 25, further including blocking communication for the IP address associated with the application when the application is associated with a policy deviation.

Example 27 includes at least one non-transitory computer readable storage media comprising computer readable instructions that, when executed, cause one or more processors to, at least associate first router data with application identification data, generate metric values associated with a segment of the first router data, generate histograms of the metric values, generate a signature model based on the histograms, and identify the application based on second router data by applying the second router data to the signature model.

Example 28 includes the at least one storage media as defined in example 27, wherein the computer readable instructions, when executed, cause the one or more processors to retrieve the first router data from a router at a first time, the first time associated with a training mode.

Example 29 includes the at least one storage media as defined in example 28, wherein the computer readable instructions, when executed, cause the one or more processors to retrieve the second router data from the router at a second time, the second time after the first time, and associated with a runtime mode.

Example 30 includes the at least one storage media as defined in example 28, wherein the computer readable instructions, when executed, cause the one or more processors to identify at least one of timestamp information, source internet protocol (IP) address information, destination IP address information or packet length information.

Example 31 includes the at least one storage media as defined in example 28, wherein the computer readable instructions, when executed, cause the one or more processors to identify timestamp information, source Internet protocol (IP) address information, destination IP address information and packet length information.

Example 32 includes the at least one storage media as defined in example 27, wherein the computer readable instructions, when executed, cause the one or more processors to identify the segment as a communication pairing between a first internet protocol (IP) address and a second IP address.

Example 33 includes the at least one storage media as defined in example 32, wherein the computer readable instructions, when executed, cause the one or more processors to identify at least one of the first IP address or the second IP address of the segment as associated with a user device local to a router.

Example 34 includes the at least one storage media as defined in example 27, wherein the computer readable instructions, when executed, cause the one or more processors to retrieve scores from the signature model, the scores respectively associated with respective applications.

Example 35 includes the at least one storage media as defined in example 27, wherein the computer readable instructions, when executed, cause the one or more processors to identify metrics values as a frequency of communication between a first internet protocol (IP) address and a second IP address.

Example 36 includes the at least one storage media as defined in example 27, wherein the computer readable instructions, when executed, cause the one or more processors to identify metrics values as at least one of a communication duration or a communication packet size.

Example 37 includes the at least one storage media as defined in example 27, wherein the computer readable instructions, when executed, cause the one or more processors to not block communication for an internet protocol (IP) address associated with an application when the application is associated with an indication of trust.

Example 38 includes the at least one storage media as defined in example 37, wherein the computer readable instructions, when executed, cause the one or more processors to block communication for the IP address associated with the application when the application is associated with an indication of harm.

Example 39 includes the at least one storage media as defined in example 37, wherein the computer readable instructions, when executed, cause the one or more processors to block communication for the IP address associated with the application when the application is associated with a policy deviation.

Example 40 includes a system to identify an application, the system comprising means for associating first router data with application identification data, means for generating metric values associated with a segment of the first router data, the generating means to generate histograms of the metric values, means for generating a signature model based on the histograms, and means for identifying the application based on second router data by applying the second router data to the signature model.

Example 41 includes the system as defined in example 40, further including a means for retrieving the first router data from a router at a first time, the first time associated with a training mode.

Example 42 includes the system as defined in example 41, wherein the retrieving means is to retrieve the second router data from the router at a second time, the second time after the first time, and associated with a runtime mode.

Example 43 includes the system as defined in example 41, wherein the retrieving means is to identify at least one of timestamp information, source internet protocol (IP) address information, destination IP address information or packet length information.

Example 44 includes the system as defined in example 41, wherein the retrieving means is to identify timestamp information, source Internet protocol (IP) address information, destination IP address information and packet length information.

Example 45 includes the system as defined in example 40, wherein the associating means is to identify the segment as a communication pairing between a first internet protocol (IP) address and a second IP address.

Example 46 includes the system as defined in example 45, wherein the associating means is to identify at least one of the first IP address or the second IP address of the segment as associated with a user device local to a router.

Example 47 includes the system as defined in example 40, wherein the identifying means is to retrieve scores from the signature model, the scores respectively associated with respective applications.

Example 48 includes the system as defined in example 40, further including means for application management to not block communication for an internet protocol (IP) address associated with an application when the application is associated with an indication of trust.

Example 49 includes the system as defined in example 48, wherein the application management means is to block communication for the IP address associated with the application when the application is associated with an indication of harm.

Example 50 includes the system as defined in example 48, wherein the application management means is to block communication for the IP address associated with the application when the application is associated with a policy deviation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to identify a first application, the apparatus comprising:
 a data labeler to analyze router data by:
  identifying a first Internet protocol (IP) address as a source and a second IP address as a destination at a first time;
  identifying the first IP address as the destination and the second IP address as the source at a second time; and
  forming an analysis segment based on a pairing of the first IP address and the second IP address;
 a metrics manager to, when the analysis segment occurs a threshold number of times:
  generate first metric values for the analysis segment, the first metric values corresponding to a first communication demand of a second application; and
  generate first histogram pictures based on the first metric values; and
 an application identifier to identify the first application by applying second histogram pictures to a convolutional neural network trained with the first histogram pictures, the second histogram pictures based on second metric values corresponding to a second communication demand of the first application, the first histogram pictures based on the first metric values corresponding to the first communication demand of the second application.

2. The apparatus as defined in claim 1, further including a router manager to retrieve the router data from a router at the first time and at the second time, the first time and the second time associated with a training mode.

3. The apparatus as defined in claim 2, wherein the router manager is to generate the second metric values at a third time, the third time after the first and the second times and associated with a runtime mode.

4. The apparatus as defined in claim 2, wherein the router manager is to identify at least one of timestamp information, source IP address information, destination IP address information, or packet length information.

5. The apparatus as defined in claim 1, wherein the application identifier is to retrieve scores from the convolutional neural network, the scores respectively associated with respective applications.

6. The apparatus as defined in claim 1, wherein the first metric values generated by the metrics manager include a frequency of communication between the first IP address and the second IP address.

7. The apparatus as defined in claim 1, wherein the first metric values generated by the metrics manager include at least one of a communication duration or a communication packet size.

8. The apparatus as defined in claim 1, further including an application manager to not block communication for an IP address associated with the first application when the first application is associated with an indication of trust.

9. The apparatus as defined in claim 8, wherein the application manager is to block communication for the IP address associated with the first application when the first application is associated with an indication of harm.

10. The apparatus as defined in claim 8, wherein the application manager is to block communication for the IP address associated with the first application when the first application is associated with a policy deviation.

11. A computer implemented method to identify a first application, the method comprising:
analyzing, by executing an instruction with at least one processor, router data by:
identifying a first Internet protocol (IP) address as a source and a second IP address as a destination at a first time;
identifying the first IP address as the destination and the second IP address as the source at a second time; and
forming an analysis segment based on a pairing of the first IP address and the second IP address;
generating, by executing an instruction with the at least one processor, when the analysis segment occurs a threshold number of times:
first metric values for the analysis segment, the first metric values corresponding to a first communication demand of a second application; and
first histogram pictures based on the first metric values; and
identifying, by executing an instruction with the at least one processor, the first application by applying second histogram pictures to a convolutional neural network trained with the first histogram pictures, the second histogram pictures based on second metric values corresponding to a second communication demand of the first application, the first histogram pictures based on the first metric values corresponding to the first communication demand of the second application.

12. The method as defined in claim 11, further including not blocking communication for an IP address associated with the first application when the first application is associated with an indication of trust.

13. The method as defined in claim 12, further including blocking communication for the IP address associated with the first application when the first application is associated with an indication of harm.

14. The method as defined in claim 12, further including blocking communication for the IP address associated with the first application when the first application is associated with a policy deviation.

15. At least one non-transitory computer readable storage media comprising computer readable instructions that, when executed, cause one or more processors to, at least:
analyze router data by:
identifying a first Internet protocol (IP) address as a source and a second IP address as a destination at a first time;
identifying the first IP address as the destination and the second IP address as the source at a second time; and
forming an analysis segment based on a pairing of the first IP address and the second IP address;
generate, when the analysis segment occurs a threshold number of times:
first metric values for the analysis segment, the first metric values corresponding to a first communication demand of a first application; and
first histogram pictures based on the first metric values; and
identify an application by applying second histogram pictures to a convolutional neural network trained with the first histogram pictures, the second histogram pictures based on second metric values corresponding to a second communication demand of a second application, the first histogram pictures based on the first metric values corresponding to the first communication demand of the first application.

16. The at least one non-transitory computer readable storage media as defined in claim 15, wherein the computer readable instructions, when executed, cause the one or more processors to identify the first metric values as a frequency of communication between the first IP address and the second IP address.

17. The at least one non-transitory computer readable storage media as defined in claim 15, wherein the computer readable instructions, when executed, cause the one or more processors to identify the first metric values as at least one of a communication duration or a communication packet size.

18. The at least one non-transitory computer readable storage media as defined in claim 15, wherein the computer readable instructions, when executed, cause the one or more processors to not block communication for an IP address associated with the second application when the second application is associated with an indication of trust.

19. The at least one non-transitory computer readable storage media as defined in claim 18, wherein the computer readable instructions, when executed, cause the one or more processors to block communication for the IP address associated with the second application when the second application is associated with an indication of harm.

20. The at least one non-transitory computer readable storage media as defined in claim 18, wherein the computer readable instructions, when executed, cause the one or more processors to block communication for the IP address associated with the second application when the second application is associated with a policy deviation.

21. An apparatus to identify a first application, the apparatus comprising:
   at least one memory;
   instructions in the apparatus; and
   processor circuitry to execute the instructions to:
      analyze router data by:
         identifying a first Internet protocol (IP) address as a source and a second IP address as a destination at a first time;
         identifying the first IP address as the destination and the second IP address as the source at a second time; and
         forming an analysis segment based on a pairing of the first IP address and the second IP address;
      generate, when the analysis segment occurs a threshold number of times:
         first metric values for the analysis segment, the first metric values corresponding to a first communication demand of the first application; and
         first histogram pictures based on the first metric values; and
      identify an application by applying second histogram pictures to a convolutional neural network trained with the first histogram pictures, the second histogram pictures based on second metric values corresponding to a second communication demand of a second application, the first histogram pictures based on the first metric values corresponding to the first communication demand of the first application.

22. The apparatus as defined in claim 21, wherein the processor circuitry is to retrieve the router data from a router at the first time and at the second time, the first time and the second time associated with a training mode.

23. The apparatus as defined in claim 21, wherein the processor circuitry is to generate the second metric values at a third time, the third time after the first and the second times and associated with a runtime mode.

24. The apparatus as defined in claim 21, wherein the processor circuity is to identify at least one of timestamp information, source IP address information, destination IP address information, or packet length information.

25. The apparatus as defined in claim 21, wherein the processor circuitry is to retrieve scores from the convolutional neural network, the scores respectively associated with respective applications.

26. The apparatus as defined in claim 21, wherein the first metric values include a frequency of communication between the first IP address and the second IP address.

27. The apparatus as defined in claim 21, wherein the first metric values include at least one of a communication duration or a communication packet size.

28. The apparatus as defined in claim 21, wherein the processor circuitry is to not block communication for an IP address associated with the first application when the first application is associated with an indication of trust.

29. The apparatus as defined in claim 28, wherein the processor circuitry is to block communication for the IP address associated with the first application when the first application is associated with an indication of harm.

30. The apparatus as defined in claim 28, wherein the processor circuitry is to block communication for the IP address associated with the first application when the first application is associated with a policy deviation.

* * * * *